United States Patent [19]

Mangels et al.

[11] 4,285,895

[45] Aug. 25, 1981

[54] METHOD OF DENSIFYING A REACTION BONDED SILICON NITRIDE ARTICLE

[75] Inventors: John A. Mangels, Flat Rock; Gerald J. Tennenhouse, Oak Park, both of Mich.

[73] Assignee: Ford Motor Company, Dearborn, Mich.

[21] Appl. No.: 78,129

[22] Filed: Sep. 24, 1979

Related U.S. Application Data

[63] Continuation-in-part of Ser. No. 23,426, Mar. 23, 1979, abandoned.

[51] Int. Cl.$^3$ .............................................. C04B 35/58
[52] U.S. Cl. ..................................... 264/65; 106/73.5; 264/86; 264/325; 264/537
[58] Field of Search ................... 264/65, 325, 332, 86, 264/537; 106/73.5

[56] References Cited

U.S. PATENT DOCUMENTS

| | | | |
|---|---|---|---|
| 3,992,497 | 11/1976 | Terwilliger | 264/66 |
| 4,038,092 | 7/1977 | Baumgartner | 264/65 |
| 4,071,372 | 1/1978 | Bird | 264/332 |
| 4,112,143 | 9/1978 | Adlerborn | 264/65 |
| 4,119,690 | 10/1978 | Prochazka | 264/65 |
| 4,179,486 | 12/1979 | Lange | 264/65 |

OTHER PUBLICATIONS

Mitomo et al., "Sintering of $Si_3N_4$", Cer. Bull., vol. 55, No. 3, p. 313, Mar. 1976.
Priest et al., "Sintering of $Si_3N_4$ under High Nitryene Pressure", Jan. 1977, p. 81.

*Primary Examiner*—John Parrish
*Attorney, Agent, or Firm*—William E. Johnson; Olin B. Johnson

[57] ABSTRACT

A method of densifying a reaction bonded silicon nitride article is disclosed. In accordance with the broadest principles disclosed, a densification aid is incorporated into a reaction bonded silicon nitride article. The so-made reaction bonded silicon nitride article is enclosed in a chamber which also contains a mixture of silicon nitride powder and powder the same as the densification aid incorporated into the reaction bonded silicon nitride article. The reaction bonded silicon nitride article, and the powder mixture associated therewith, is subjected to a nitrogen gas pressure sufficient to prohibit a significant volatilization of silicon nitride at a sintering temperature. The reaction bonded silicon nitride article, the powder mixture and nitrogen gas associated therewith are heated to a temperature above 1700° C. for a time sufficient to permit sintering of that article whereby the strength of the reaction bonded silicon nitride article is increased. In accordance with preferred teachings, the densification aid can be selected from the group of materials consisting of magnesium oxide, yttrium oxide, cerium oxide and zirconium oxide.

11 Claims, No Drawings

METHOD OF DENSIFYING A REACTION BONDED SILICON NITRIDE ARTICLE

This application is a continuation-in-part of our prior application Ser. No. 023,426 filed Mar. 23, 1979, now abandoned, also entitled "A Method of Densifying a Reaction Bonded Silicon Nitride Article."

BACKGROUND OF THE INVENTION AND PRIOR ART STATEMENT

We have been working in the area of manufacturing components for gas turbine engines from silicon nitride. In such applications, it is desired to obtain the maximum strength from the silicon nitride material as that material is subjected to severe operating conditions as a component of the hot gas flow path of such a turbine engine. We have been attempting to manufacture complex shaped, high density reaction bonded silicon nitride articles for use, for example, as the rotor of a gas turbine engine.

The process of this specification is one by which high density silicon nitride articles of complex shape can be made. A complex shaped, reaction bonded silicon nitride article of moderate density can be made by methods already known in the art, such as injection molding and slip casting processes. By the process of our invention, the thus made reaction bonded silicon nitride article of moderate density is sintered so that the strength and density are increased. During the sintering, there is some slight shrinkage of the article, but not such a significant amount of shrinkage as will produce distortion, cracking, or other failures in the article.

By sintering, we mean the following. During a sintering and densification operation, the particles of a powder first form necks between adjacent particles which become the grain boundaries. Between the grain boundaries, a liquid phase may exist. The densification proceeds by a reduction in the number and size of the spaces or pores between the particles as they migrate into these grain boundaries through a transport mechanism which is followed by a partial collapse or moving together of the center points of the grains, thus producing densification.

In the method of this invention, we can tolerate a small degree of shrinkage of the article from its as-formed, low density state to its densified state. By its as-formed state, we mean a reaction bonded silicon nitride article which has been made through a process in which materials such as silicon particles are slip cast to form a particular configuration and thereafter nitrided, or wherein materials such as silicon particles are injection molded with a suitable binder, subjected to a pyrolizing operation, and thereafter nitrided. The article is not a reaction bonded silicon nitride article until after the silicon particles have been nitrided in a nitriding operation. By using either slip cast or injection molding techniques, we can make an article of complex configuration such as a rotor for a gas turbine engine. By knowing that the rate of shrinkage is going to be controlled, we can specifically make the asformed article larger than desired so that when the densification and associated shrinkage takes place, the fully densified article will have the dimensions desired in the final article, or be so close thereto that they may be readily machined to the final desired dimensions.

The prior art search conducted on the subject matter of this invention did not uncover any patents which we felt disclosed or anticipated the method of densification set forth in this specification. However, two patents did appear of interest, namely, U.S. Pat. Nos. 3,992,497 and 4,038,092. These patents will be discussed below.

U.S. Pat. No. 3,992,497 discloses a method for making a silicon nitride article in which a silicon nitride powder, not silicon powder, is mixed with a densification aid and heated rapidly to a sintering/densification temperature in the range of from 1500° C. to 1700° C. and held there for a very short period of time in the range from 5 to 30 minutes. Thereafter, the product is rapidly cooled. The patent did not state the particular atmosphere used during the sintering operation. This disclosed process is different from the one disclosed herein in that the temperatures are significantly lower than those used by us, the time at temperature for the sintering operation is very much less than those required in our process and there is no stated requirement that a nitrogen atmosphere be present, as is required in our process. As an additional matter, when silicon nitride powder, rather than the silicon powder we start with, which is subsequently converted into silicon nitride after being formed into the shape of an article, is mixed with a densification aid and thereafter formed into an article which is subsequently sintered, a great deal of shrinkage takes place in the article, e.g., as much as 20% or more.

U.S. Pat. No. 4,038,092 discloses a process for increasing the strength of a reaction sintered silicon nitride body by impregnating the surface of that body with a finely divided alumina. After such impregnation, the article is fired in a nitrogen atmosphere to a temperature in excess of 1200° C. up to about 1400° C. The patent also states that this reaction is carried out under an appreciable pressure of silicon monoxide so that disassociation of silicon nitride and a loss of silicon from the body is avoided. This patent does not teach a sintering of a body, but rather teaches the formation of a surface layer in which the alumina plays a part. Also, the patent states that the use of a silicon monoxide atmosphere is absolutely essential to the process. The process taught in this patent is different than the one to be disclosed in this specification in that the temperature limits are very low, the requirement of a silicon monoxide atmosphere being present during the action, and the fact that alumina is used only to aid in the formation of a surface layer on the article.

SUMMARY OF THE INVENTION

This invention relates to a method of treating a reaction bonded silicon nitride article and, more particularly, to a method of densifying a reaction bonded silicon nitride article after that article has been formed by reaction sintering of silicon particles which have been formed into the shape of the article.

In accordance with the preferred teachings of the method of this invention, a reaction bonded silicon nitride article is densified in the following manner. The reaction bonded silicon nitride article is formed by reaction sintering of silicon particles formed into the shape of the article. A densification aid is incorporated into the reaction bonded silicon nitride article. The reaction bonded silicon nitride article is enclosed in a chamber which also contains a mixture of silicon nitride powder and additional powder, the additional powder being the same as the densification aid incorporated into the reaction bonded silicon nitride article. The reaction bonded silicon nitride article and the mixture is subjected to a nitrogen gas pressure sufficient to prohibit a significant volatilization of silicon nitride at a sintering temperature. The reaction bonded silicon nitride article, the powder mixture, and nitrogen gas present are heated to a temperature above 1700° C. for a time sufficient to permit sintering of that article whereby the strength of the reaction bonded silicon nitride article is increased.

In accordance with specific embodiments of the method of this invention, the reaction bonded silicon nitride article is made by a method wherein starting materials for the article are either injection molded or slip cast. The densification aid is included as one of the starting materials along with silicon particles for either the injection molding or the slip casting operation. After article formation, the article is subjected to a nitriding operation to form a reaction bonded silicon nitride article containing the densification aid.

In accordance with other aspects of the method of this invention, the reaction bonded silicon nitride article having the densification aid incorporated therein may have the powder mixture either placed in the chamber away from the article, or may have the powder mixture packed about the article.

In accordance with a detailed teaching of an alternate form of the method of this invention, a reaction bonded silicon nitride article is densified in the following manner. In this case, the densification aid need not be incorporated in the reaction bonded silicon nitride article. The reaction bonded silicon nitride article is packed in a packing mixture consisting of silicon nitride powder and a densification aid. The reaction bonded silicon nitride article and packing mixture are subjected to a nitrogen gas pressure sufficient to prohibit a significant volatilization of silicon nitride at a sintering temperature. The reaction bonded silicon nitride article, packing mixture and nitrogen gas present are heated to a sintering temperature above 1700° C. for a time sufficient to permit migration of the densification aid into the reaction bonded silicon nitride article and a sintering of that article whereby the strength of the reaction bonded silicon nitride article is increased.

In accordance with detailed teachings of the method of this invention, the densification aid is selected from a group of materials consisting of magnesium oxide, yttrium oxide, cerium oxide and zirconium oxide. Additionally, the powder mixture associated with the reaction bonded silicon nitride article can consist of from 4 to 20% by weight of the densification aid, with the balance consisting essentially of silicon nitride powder.

In accordance with still another preferred embodiment of the method of this invention, the reaction bonded silicon nitride article is impregnated with the same densification aid used in the packing mixture prior to placement of the silicon nitride article in the packing mixture. A preferred densification aid is one wherein the metallic component thereof is magnesium.

DESCRIPTION OF THE PREFERRED EMBODIMENTS

The novel features that are considered characteristic of the invention are set forth with particularity in the appended claims. The invention, itself, however, both as to its organization and its method of operation, together with additional objects and advantages thereof, will best be understood from the following description of specific embodiments.

EXAMPLE 1

Reaction bonded silicon nitride test bodies, i.e., rectangular bars ¼ inch×¼ inch×2 inches, and turbine stators of complex shape, approximately 5 inches in diameter, were impregnated with magnesium compounds in the following manner. The test bodies are reaction bonded silicon nitride material having a moderate density approximately 86% of theoretical. These test bodies were submerged in a saturated solution of $MgCl_2.6H_2O$ in methanol. A vacuum was drawn over the surface of the liquid for 1 hour to improve the ability of the solution to enter into the porous test bodies. The vacuum was then broken with air and the samples removed. The samples were dried at 120° C. then heated under vacuum for 1 hour at 600° C. to dry the same and deposit Mg in the article. This process was repeated until the weight gain in each article corresponded to a pick-up in the article of approximately 2% by weight. The test bodies were then packed in a packing powder having the composition 95% silicon nitride powder-5% magnesium oxide. The test bodies were heated to a temperature of 1800° C. for 2 hours under a pressure of 300 psi of nitrogen gas. The samples were heated to 1800° C. at a rate of 900° C. for 1 hour.

On cooling, all of the test bodies were found to have undergone a linear shrinkage in the range of 3 to 4%. The test bodies had densities which had increased from the original approximately 86% of theoretical to a density of approximately 99% of theoretical. The samples, on an average, show a modulus of rupture increase from 43,000 psi to 70,000 psi. Scanning electron microscope analysis of the test bodies revealed that there is generally a uniform distribution of magnesium throughout the test bodies.

EXAMPLE 2

Reaction bonded silicon nitride bodies were packed in a packing powder having a composition 90% silicon nitride powder-10% magnesium oxide. In this case, there was no pre-impregnation of the test bodies. The test bodies were heated at a rate of approximately 900° C. for 1 hour to a temperature of 1800° C. and held at that temperature for 2 hours. The heating to temperature and hold at temperature were carried out with a pressure of 300 psi of nitrogen. The pressure of nitrogen is sufficient to prevent volatilization of the silicon nitride material at the 1800° C. temperature. The samples were cooled back to room temperature and it was found that on the average the density of the test bodies increased from about 86% of theoretical in an as-formed state to about 94% of theoretical in the densified state. On the average, the modulus of rupture of the test bodies increased from about 34,000 psi to about 50,000 psi.

EXAMPLE 3

Reaction bonded silicon nitride components, such as rotor blade rings, stator and test specimens, were packed in a silicon nitride crucibles containing a packing powder with compositions varying for different samples from 8 to 20 weight percent yttrium oxide, with the balance being silicon nitride powder. The crucibles and associated samples, in all cases, were heated to a temperature of 1800° C. at a rate which took from 1 to 3 hours to reach said temperature. The temperature was held in each case at 1800° C. for 2 hours. The furnace environment was kept under nitrogen gas at a pressure of about 300 psi. The overall results of this testing showed ½ to 1% linear shrinkage in the test samples. The reaction bonded silicon nitride articles were densified in a range from the original 86% to a final 90–92% of theoretical. In all cases, there was no visible distortion of the stators. On the average, the strength of the reaction bonded silicon nitride components was increased from about 43,000 psi to about 55,000 psi.

EXAMPLE 4

Reaction bonded silicon nitride components, such as rotor blade rings and test specimens, were packed in a silicon nitride crucible containing a packing powder with a composition of 20 weight percent yttrium oxide, with the balance being silicon nitride. The crucible was heated to a temperature of 1850° C. over a 3 hour heating program until the temperature reached 1850° C., which temperature was maintained for 2 additional hours. Thereafter, the test components were permitted to cool back to room temperature. The furnace atmosphere was maintained at 300 psi of nitrogen during this heating cycle. Again, the results of this testing indicated linear shrinkage in the range from ½ to 1%, with a densification from an original density of about 86% theoretical to a density in the range of 92–94% of theoretical. The overall strength of the samples was increased from an average of about 43,000 psi to about 63,000 psi. No weight loss was noted due to silicon nitride decomposition from the samples, and there was no visible deformation of the blade rings.

EXAMPLE 5

Reaction bonded silicon nitride components, such as blade rings and test specimens, were packed in a silicon nitride crucible containing a packing powder with a composition 20 weight percent yttrium oxide, with the balance being silicon nitride powder. The crucible was heated to 1850° C. over a period of 1 hour and then held at that temperature for 4 hours. The furnace atmosphere was maintained at 300 psi of nitrogen. We observed the following results. Linear shrinkage in the components was in the range from 1 to 2%. The reaction bonded silicon nitride components were densified from an original density of approximately 86% of theoretical to a density in the range of 92–94% of theoretical. The strength of the articles was generally increased from an average of about 43,000 psi to an average of about 62,000 psi, with no observable weight loss due to silicon nitride decomposition.

EXAMPLE 6

Reaction bonded silicon nitride test bars and turbine rotors, as above characterized, were fabricated in the following manner. Silicon metal powder yttrium oxide densification aid were mixed in the following weight percent proportion: 88% silicon and 12% yttrium oxide. This powder mixture was then combined either with an organic binder for injection molding, or with water for a slip casting operation. Components were fabricated either by an injection molding operation in the case where an organic binder was used, or a slip casting operation where water was used as the vehicle. The organic binder or water was then driven off of the injection molded or slip cast article by heating the article slowly to a temperature of about 400° C. in argon in the case of the injection molded article, or air in the case of the slip cast article. Thereafter, the parts were nitrided to form reaction bonded silicon nitride articles.

These articles had a chemical composition of about 91% by weight silicon nitride, and 9% by weight yttrium oxide. The phase composition was predominantly alpha silicon nitride with minor phases of beta silicon nitride along with a yttrium, silicon, oxygen, nitrogen phase.

The yttrium containing reaction bonded silicon nitride articles were then placed in a packing powder of silicon nitride and yttrium oxide and then placed in a sintering furnace. The powder had a composition of 92° by weight silicon nitride, and 8 to 10% by weight yttrium oxide. The articles were sintered at a temperature of 1925° C. for four hours under 300 psi nitrogen over pressure. The sintered silicon nitride articles overall had a density of 3.25 g/cc and a strength average of about 77,000 psi. On the average, 5% linear shrinkage was observed in these articles.

EXAMPLE 7

Yttrium containing reaction bonded silicon nitride was fabricated as in Example 6. The so-formed articles were then placed in a closed silicon nitride crucible containing a silicon nitride/yttrium oxide packing powder, with a composition by weight of 90 to 92% silicon nitride and 8 to 10% yttrium oxide. However, the samples placed in the crucible were not placed in the powder, but rather in association therewith as, for example, on top of or beside the powder. The articles were sintered in this condition at 1925° C. for four hours under 300 psi nitrogen over pressure. The average density of the so-formed articles was about 3.25 g/cc and the average strength of the articles was about 75,000 psi. Once again, a linear shrinkage of about 5% was observed.

EXAMPLE 8

Material samples of reaction bonded silicon nitride were prepared as defined in Example 6. However, these components were sintered at a temperature of 1875° C. at 300 psi nitrogen over pressure. The articles were packed in a silicon nitride/yttrium oxide packing powder of the above-described composition. Once again, densities in a range of about 3.20 to 3.25 were obtained with strengths in a range of from 70,000 psi to about 75,000 psi. A linear shrinkage of about 5% was observed.

EXAMPLE 9

Yttrium containing reaction bonded silicon nitride articles were fabricated by nitriding articles formed of a mixture of 90.3% by weight silicon and 9.7% by weight yttrium oxide. This resulted in reaction bonded silicon articles with a chemical composition of about 93% silicon nitride and 7% yttrium oxide. The phase composition of the articles was alpha and beta silicon nitride, plus a yttrium, silicon, oxygen, nitrogen phase.

The articles so-formed were then sintered either packed in a yttrium silicon nitride packing powder, or exposed to such a powder in an enclosed chamber. The articles were sintered at 1875° C. for a period of four hours under a 300 psi nitrogen over pressure. Articles so-formed had densities in a range from about 2.9 to 3.00 g/cc with strengths in a range from about 68,000 psi to 75,000 psi. Linear shrinkage in these articles was observed in a range from about 3% to 3½%.

EXAMPLE 10

A turbocharger rotor was slip cast from a mixture of silicon powder containing 12% by weight yttrium oxide. This rotor was nitrided to form a yttrium reaction bonded silicon nitride material having a density of about 2.5 g/cc. This rotor was then placed in a packing powder of silicon nitride and yttrium oxide and sintered at 1925° C. for four hours at a 300 psi nitrogen over pressure. A 7% linear shrinkage was observed after sintering, and the final density was 3.05 g/cc. No visible distortions were noted in the sintered component.

In accordance with some of the generalized teachings of the method of this invention, the temperature to which the reaction bonded silicon nitride article, packing mixture and nitrogen gas are heated should be to a sintering temperature in a range from about a temperature above 1700° C. to about 1950° C. The time at which the material is held at the sintering temperature should be for a period of time from about ½ hour to about 4 hours, with 2 hours or more preferred. The nitrogen gas pressure can be varied to a pressure in the range from about 250 lbs. per square inch to about 1500 lbs. per square inch. All of these limits are preferred limits. These limits are the limits within which the process is most preferably carried out to secure the advantages of the process with the maximum utilization of equipment available.

While the examples of this specification have demonstrated the usefulness of magnesium oxide and yttrium oxide as a densification aid, cerium oxide and zirconium oxide, as well as other densification aids, may also be used in the methodology taught.

While particular embodiments of the invention have been illustrated and described, it will be obvious to those skilled in the art that various changes and modifications may be made without departing from the invention and it is intended to cover, in the appended claims, all such modifications and equivalents as fall within the true spirit and scope of this invention.

What is claimed is:

1. A method of densifying a reaction bonded silicon nitride article which comprises:
    packing the reaction bonded silicon nitride article in a packing mixture consisting of silicon nitride powder and a densification aid;
    subjecting the reaction bonded silicon nitride article and packing mixture to a nitrogen gas pressure sufficient to prohibit a significant volatilization of silicon nitride at a sintering temperature; and
    heating the reaction bonded silicon nitride article, packing mixture and nitrogen gas present to a sintering temperature above 1700° C. for a time sufficient to permit migration of said densification aid into the reaction bonded silicon nitride article and a sintering of that article whereby the strength of the reaction bonded silicon nitride article is increased.

2. The method of claim 1 wherein: said densification aid is selected from the group consisting of magnesium oxide, yttrium oxide, cerium oxide and zirconium oxide.

3. The method of claims 1 or 2 wherein: said packing mixture consists of from 4 to 20% by weight of said densification aid, the balance consisting essentially of silicon nitride powder.

4. The method of claim 1 wherein: prior to packing the reaction bonded silicon nitride article in said packing mixture the silicon nitride article is impregnated with the same densification aid which is used in said packing mixture.

5. The method of claim 4 wherein: the metallic component of said densification aid is magnesium.

6. The method of claim 1 wherein: the reaction bonded silicon nitride article, said packing mixture, and said nitrogen gas present are heated to a sintering temperature in a range above 1700° C. to no more than 1950° C. wherein a hold time at reaction temperature is for a period of time from one-half hour to four hours, and wherein said nitrogen gas pressure is in a range from about 250 lbs. per square inch to about 1500 lbs. per square inch.

7. A method of densifying a reaction bonded silicon nitride article which comprises:
    incorporating a densification aid into a reaction bonded silicon nitride article;
    enclosing the reaction bonded silicon nitride article in a chamber also containing a mixture of silicon nitride powder and powder the same as the densification aid incorporated into the reaction bonded silicon nitride article;
    subjecting the reaction bonded silicon nitride article and the powder mixture to a nitrogen gas pressure sufficient to prohibit a significant volatilization of silicon nitride at a sintering temperature; and
    heating the reaction bonded silicon nitride article, the powder mixture and the nitrogen gas present to a temperature above 1700° C. for a time sufficient to permit sintering of that article whereby the strength of the reaction bonded silicon nitride article is increased.

8. The method of claim 7 wherein: the reaction bonded silicon nitride article is made by a method wherein starting materials for the article are injection molded and the densification aid is included as one of the starting materials.

9. The method of claim 7 wherein: the reaction bonded silicon nitride article is made by a method wherein starting materials for the article are slip cast and the densification aid is included as one of the starting materials.

10. The method of claim 7 wherein: the reaction bonded silicon nitride article is made by a method wherein the shape of the article is formed in a slip cast operation and the densification aid is incorporated in the article after formation but before nitriding thereof.

11. The method of claims 7, 8, 9 or 10 wherein: the mixture contained in the chamber is packed about the reaction bonded silicon nitride article.

* * * * *